(12) United States Patent
D'Aluisio

(10) Patent No.: US 8,882,126 B2
(45) Date of Patent: Nov. 11, 2014

(54) BICYCLE FRAME WITH INTERNAL STRUT

(71) Applicant: Specialized Bicycle Components, Inc., Morgan Hill, CA (US)

(72) Inventor: Christopher P. D'Aluisio, Corralitos, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/787,125

(22) Filed: Mar. 6, 2013

(65) Prior Publication Data

US 2014/0252744 A1    Sep. 11, 2014

(51) Int. Cl.
*B62K 1/00*    (2006.01)
*B62K 3/02*    (2006.01)

(52) U.S. Cl.
CPC ........................................ *B62K 3/02* (2013.01)
USPC .................................... 280/281.1; 280/288.3

(58) Field of Classification Search
USPC ....................... 280/281.1, 288.1, 288.2, 288.3
See application file for complete search history.

(56) References Cited

U.S. PATENT DOCUMENTS

| 4,067,589 | A  | * | 1/1978 | Hon ............................... 280/278 |
| 5,769,442 | A  |   | 6/1998 | Robinson et al. |
| 6,848,700 | B1 |   | 2/2005 | Fritschen |
| 7,651,110 | B2 | * | 1/2010 | Davis et al. ................. 280/281.1 |
| 7,971,892 | B2 | * | 7/2011 | Sasnowski et al. ......... 280/288.3 |
| 8,636,294 | B2 | * | 1/2014 | Klieber ....................... 280/281.1 |

FOREIGN PATENT DOCUMENTS

WO    2006108278    10/2006

* cited by examiner

*Primary Examiner* — Kevin Hurley
(74) *Attorney, Agent, or Firm* — Michael Best & Friedrich LLP

(57) ABSTRACT

A bicycle including a front wheel, a rear wheel, and a bicycle frame assembly supported on the front and rear wheels. The bicycle frame assembly includes a front fork supported by the front wheel, and a main frame that has a head tube and a down tube extending rearward and downwardly relative to the head tube. The down tube has a front wall, a rear wall, and an internal strut connecting the front wall and the rear wall.

18 Claims, 9 Drawing Sheets

BICYCLE FRAME WITH INTERNAL STRUT

BACKGROUND

The present invention relates generally to bicycles and specifically to bicycle frames.

Bicycle frames have been manufactured for many years in a variety of configurations and using a variety of materials. Today, many bicycle frames have a configuration called a "diamond frame," which includes a main frame and a rear frame. The main frame typically includes a head tube, a top tube, a down tube, and a seat tube. The rear frame typically includes a pair of seatstays and a pair of chainstays. A pair of rear forks commonly connects opposing pairs of seatstays and chainstays, and a bottom bracket commonly connects the down tube, seat tube, and chainstays to provide a location for a crank assembly. Some frames omit the top tube to create a "step-through frame."

In order to provide steering function, bicycle frames typically include a front fork pivotally coupled to the head tube. Upper and lower head tube bearings are often used to facilitate rotation of the front fork relative to the head tube and to transmit force from the front fork to the main frame. The location rearward of the lower head tube bearing is a place of high stress on most bicycle frames.

SUMMARY

In one embodiment, the present invention provides a bicycle including a front wheel, a rear wheel, and a bicycle frame assembly supported on the front and rear wheels. The bicycle frame assembly includes a front fork supported by the front wheel, and a main frame that has a head tube and a down tube extending rearward and downwardly relative to the head tube. The down tube has a front wall, a rear wall, and an internal strut connecting the front wall and the rear wall.

In another embodiment the present invention provides a bicycle frame assembly including a front fork adapted to be supported by a front wheel, and a main frame that has a head tube and a down tube extending rearward and downwardly relative to the head tube. The down tube has a front wall, a rear wall, and an internal strut connecting the front wall and the rear wall.

In another embodiment the invention provides a bicycle frame including a main frame that has a head tube and a down tube extending rearward and downwardly relative to the head tube. The down tube has a front wall, a rear wall, and an internal strut connecting the front wall and the rear wall.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
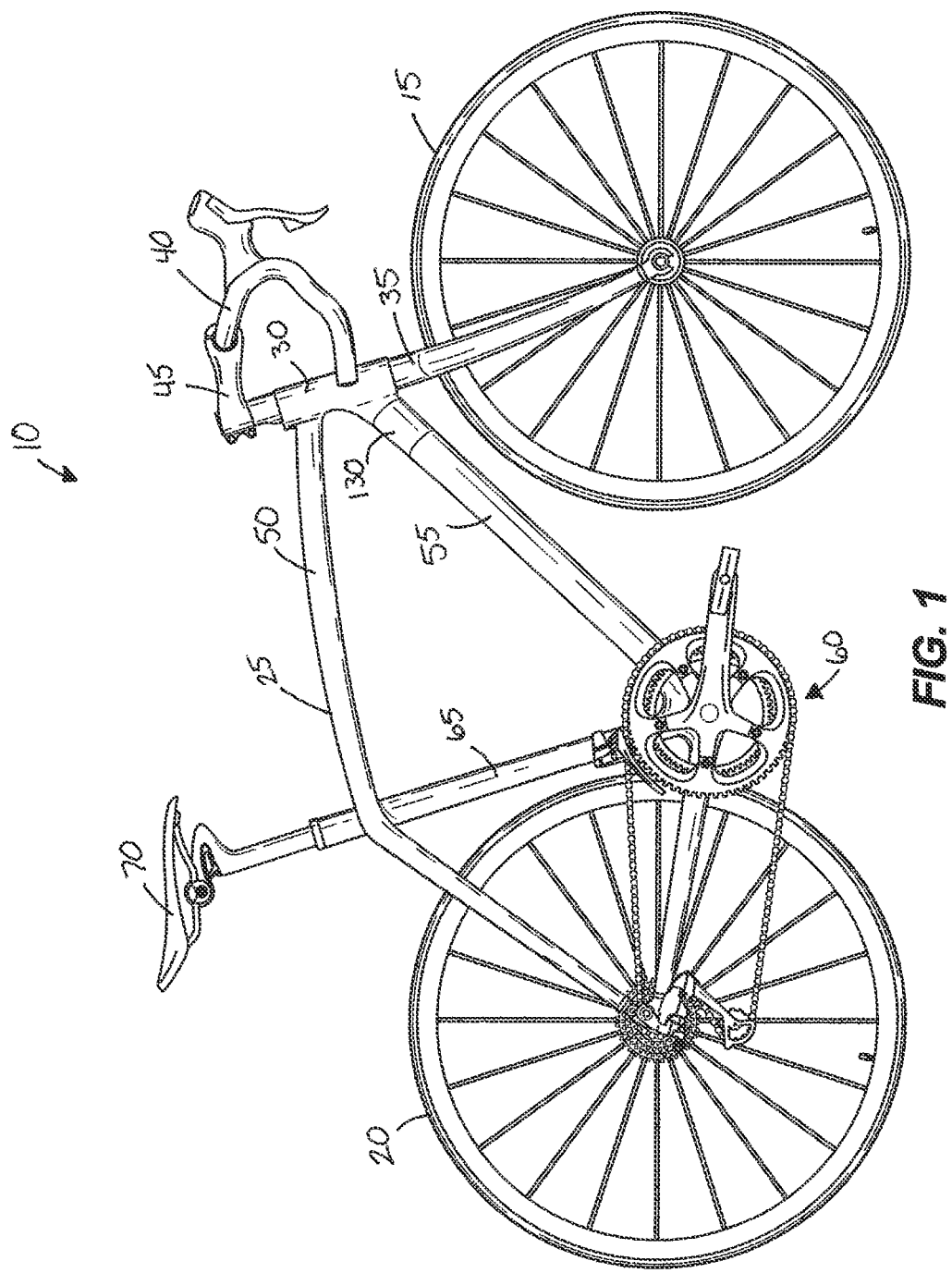
FIG. 1 a side view of a bicycle having a frame embodying the present invention.

FIG. 1 illustrates a bicycle 10 that includes a front wheel 15, a rear wheel 20, and a frame 25. The frame 25 has a head tube 30 and a front fork 35 rotationally supported by the head tube 30 and that secures the front wheel 15 to the frame 25. The bicycle 10 further includes a handlebar 40 and a stem assembly 45 securing the handlebar 40 to the front fork 35 such that movement of the handlebar 40 results in movement of the stem assembly 45 and the fork 35. The frame 25 also has a top tube 50 connected to and extending rearward from the head tube 30, and a down tube 55 connected to the head tube 30 below the top tube 50 and extending generally rearward and downward from the head tube toward a bottom bracket supporting a drive train 60. A seat tube 65 is connected to the top tube 50 and the down tube 55, and a seat 70 is supported by the seat tube 65.

With reference to FIGS. 2-5, the illustrated down tube 55 is hollow and includes a front wall 75, a rear wall 80, and side walls 85 connected between the front and rear walls, 75, 80. As illustrated, the front wall 75, the rear wall 80, and the sidewalls 85 are curved and cooperatively define an aerodynamic down tube 55 in cross-section, although one or more of the front wall 75, the rear wall 80, and the side walls 85 can be planar (e.g., to define a rectangular down tube 55 in cross-section).

Figure 2:
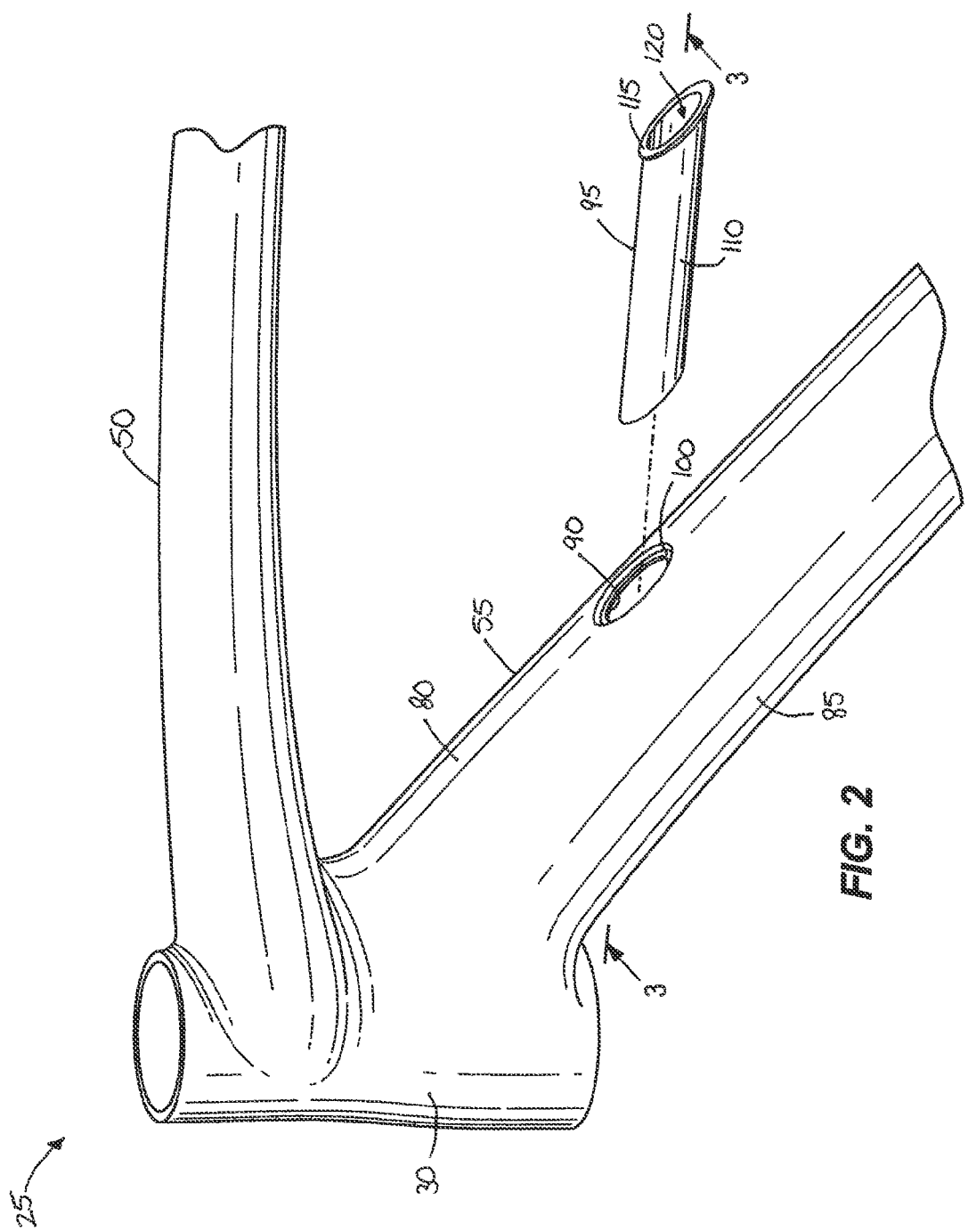
FIG. 2 is a perspective view of a portion of the frame of the bicycle illustrated in FIG. 1, including a head tube, a top tube, a down tube, and a strut exploded from the down tube.
Figure 3:
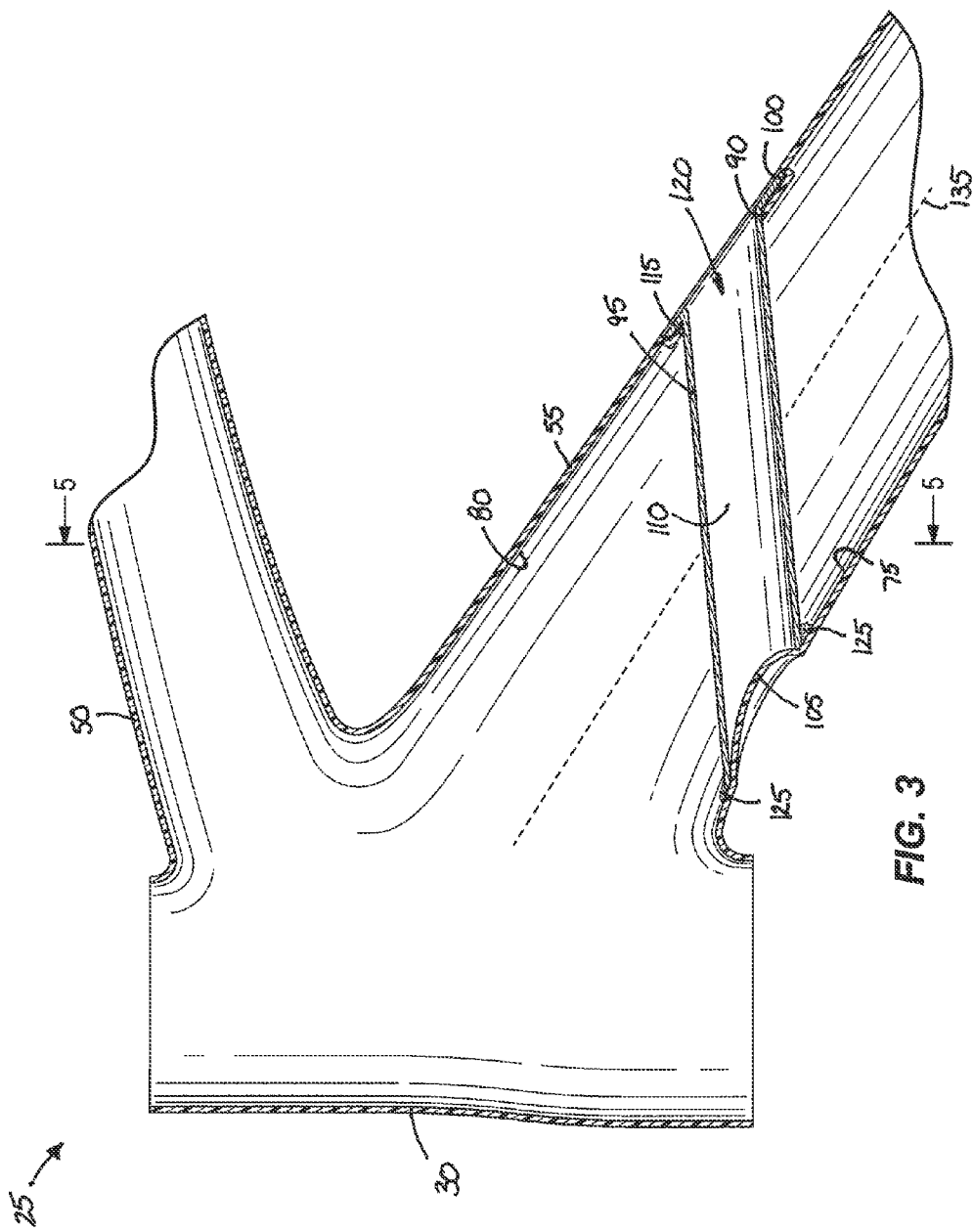
FIG. 3. is a cross-section of a portion of the frame taken along line 3-3 in FIG. 2, illustrating the down tube and the strut coupled to the down tube.
Figure 4:
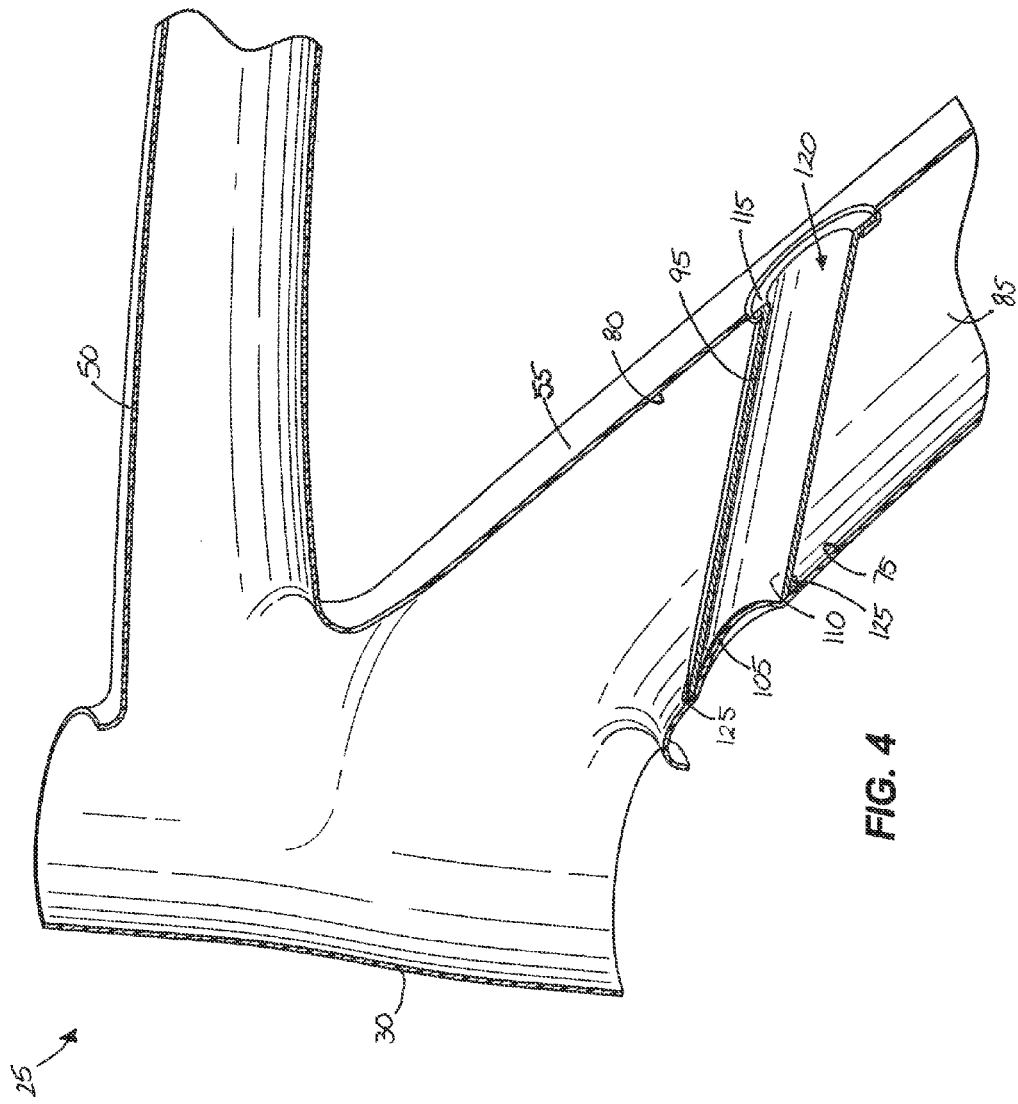
FIG. 4 is a perspective view of the frame illustrated in FIG. 3.

FIG. 2 shows that a hole or opening 90 is defined in the rear wall 80, and a structural member or strut 95 can be inserted into the down tube 55 via the opening 90 to provide structural support for the down tube 55. The illustrated opening 90 is positioned in a countersink or recess 100 that is formed in an outer surface of the rear wall 80. As shown in FIGS. 3 and 4, the down tube 55 includes an alignment feature 105 disposed or formed on an interior side of the front wall 75. The alignment feature 105 is located adjacent the head tube 30 (i.e. near an upper end of the front wall 75) and is defined by a concavity or indentation on the underside of the down tube 55 that forms a curved (e.g., convex or semi-spherical) bump on the interior side of the front wall 75.

As illustrated, the opening 90 is substantially circular to accommodate the cylindrical strut 95, although the opening 90 and the strut 95 can have other shapes (e.g., a square, rectangular, polygonal, or ovular opening and a strut 95 shaped to have a cross-section that conforms to the shape of the hole). Referring to FIGS. 2-5, the strut 95 is coupled to the front wall 75 and the rear wall 80 within the down tube 55. The illustrated strut 95 includes an elongated tubular member 110 that is positioned within the down tube 55, and a flange 115 that is disposed on an end of the tubular member 110. The distal end of the tubular member 110 opposite the flange 115 is engageable with the alignment feature 105 to properly orient the strut 95 internally within the down tube 55. As illustrated, the strut 95 is hollow such that an interior 120 of the tubular member 110 is exposed through the opening 90 when the strut 95 is coupled within the down tube 55. In other constructions, the strut 95 may be a solid member.

The flange 115 is engaged with an exterior surface of the down tube 55 on the rear wall 80. As shown in FIG. 3, the flange 115 is coupled to the rear wall 80 within the recess 100 and an exterior side of the flange 115 is substantially flush with the exterior of the down tube 55. In some constructions, the strut 95 can be removably coupled to the down tube 55. With reference to FIGS. 3 and 4, the strut 95 is adhered or fixed to front wall 75 over the alignment feature 105 (e.g., using epoxy 125) if it is desired to prevent removal or movement of the strut 95 after insertion. The strut 95 also or alternatively is adhered or fixed to the rear wall 80. With reference to FIG. 1, the strut 95 can be held in place by a wrap 130 (e.g., formed of carbon, composite, plastic, or metallic material) that at least partially surrounds the area of the down tube 55 adjacent the opening 90 and the alignment feature 105, regardless of whether the strut 95 is otherwise fixed (e.g., by adhesive) to the down tube 55.

Figure 5:
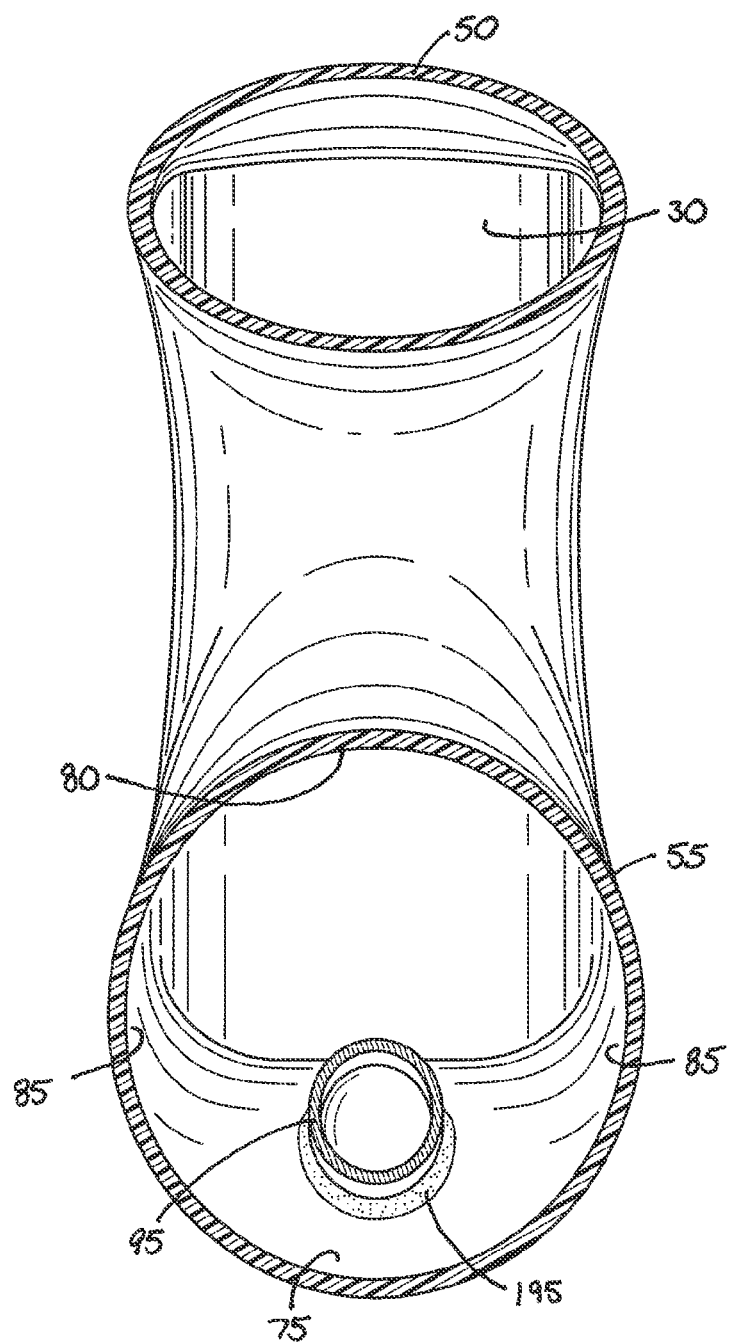
FIG. 5 is a section view of the frame taken along line 5-5 in FIG. 3.

The strut 95 is inserted into the down tube 55 through the opening 90 so that distal end of the strut 95 is engaged with the alignment feature 105. Epoxy 125 or another adhesive can be applied to the corners of the alignment feature 105 on the interior side of the front wall 75, to the end of the tubular member 110, or to both the front wall 75 and the strut 95 to fix the strut 95 to the front wall 75. Likewise, epoxy 125 can be applied to the underside of the flange 115 to fix the strut 95 to the rear wall 80. With reference to FIGS. 3 and 5, the alignment feature 105 and the opening 90 are centered laterally on the respective front and rear walls 75, 80 so that the strut 95 is spaced inward from the side walls 85 (e.g., centered between the side walls 85) when the strut 95 is positioned inside the down tube 55.

Generally, the strut 95 is oriented substantially horizontally within the down tube 55 adjacent the head tube to stiffen the down tube 55. That is, the strut 95 extends generally forward from the rear wall 80 to the front wall 75 to transfer a load from the front wall 75 to the rear wall 80 and avoid buckling of the down tube 55. With reference to FIG. 3, the strut 95 intersects a longitudinal axis 135 extending along the center of the down tube 55 at a non-right angle.

Figure 6:
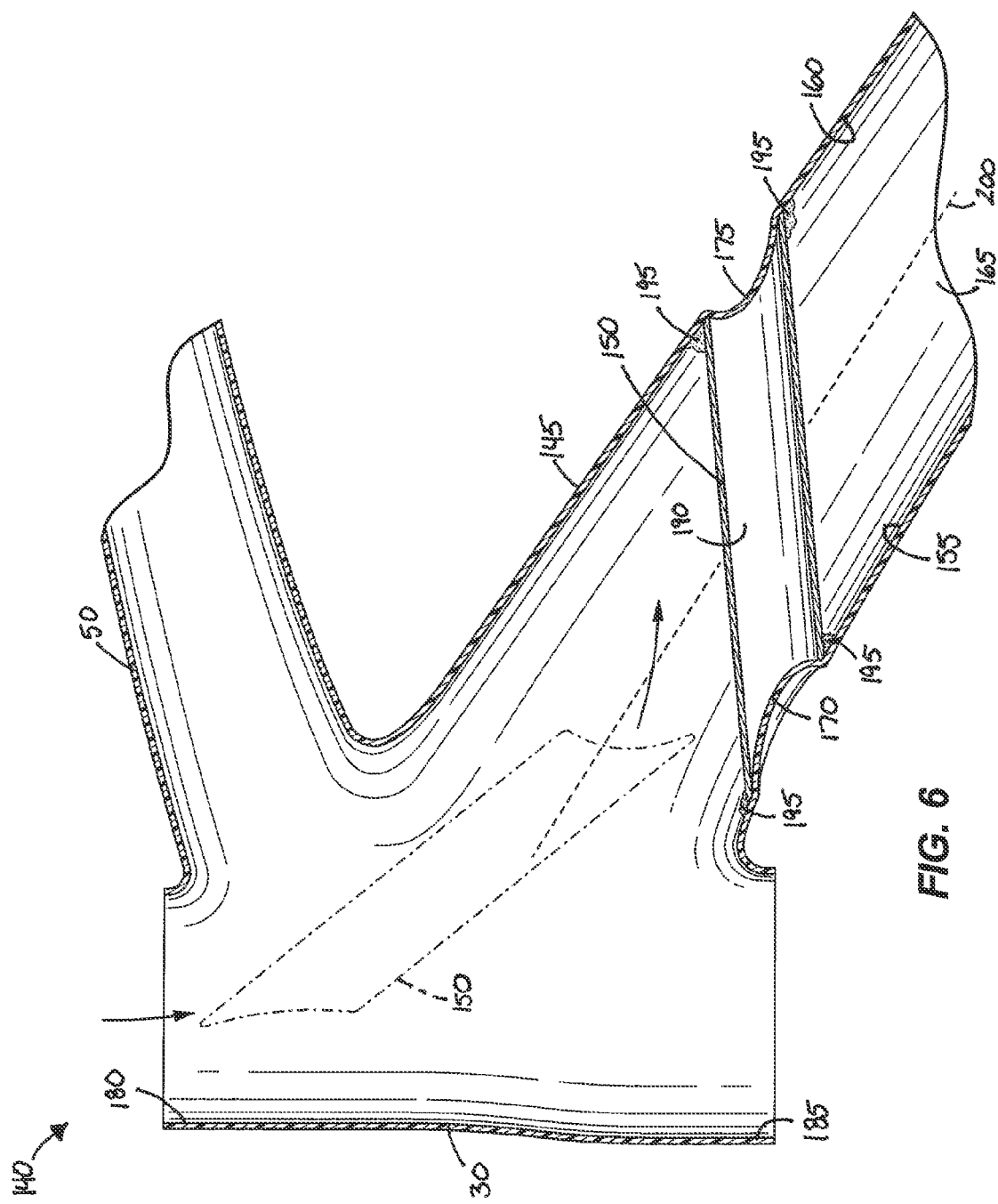
FIG. 6 is a cross-section of a portion of a second bicycle frame including a down tube and a strut coupled to an interior of the down tube.
Figure 7:
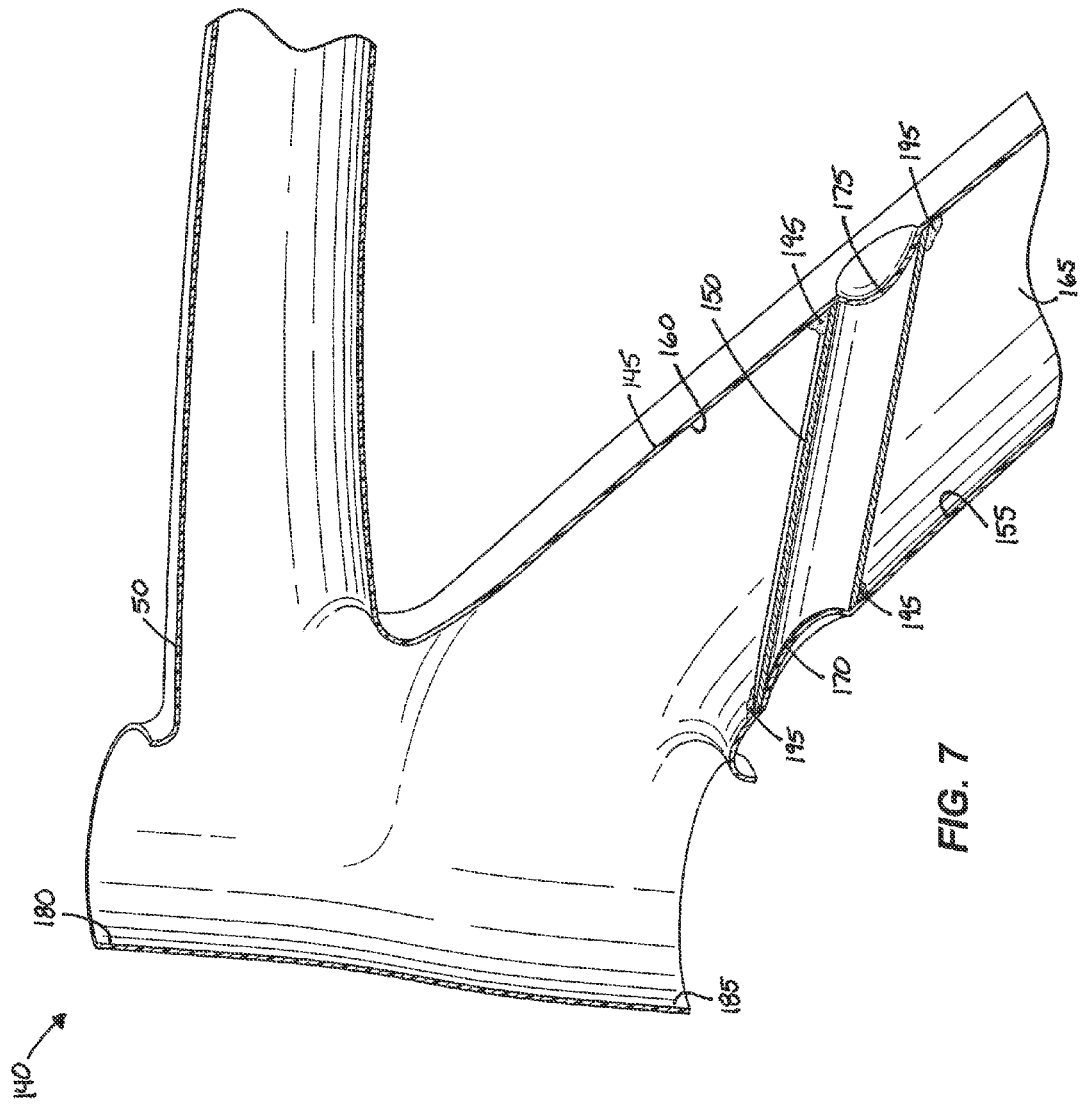
FIG. 7 is a perspective view of the frame illustrated in FIG. 6.

FIGS. 6 and 7 illustrate a portion of a second bicycle frame 140 including the head tube 30, the top tube 50, a down tube 145 connected to the head tube, and a strut 150 coupled to the down tube 145. Except as described below, the frame 140 is the same as the frame 25 described with regard to FIGS. 1-5.

The down tube 145 is hollow and includes a front wall 155, a rear wall 160, and side walls connected between the front and rear walls 155, 160. As illustrated, the down tube 145 includes a first alignment feature 170 disposed or formed on an interior side of the front wall 155, and a second alignment feature 175 disposed or formed on an interior side of the rear wall 160 substantially behind the first alignment feature 170. The first alignment feature 170 is defined by a concavity or indentation on the underside of the down tube 145 that forms a curved (convex or semi-spherical) bump on the interior side of the front wall 155. Similarly, the second alignment feature 175 is defined by a concavity or indentation on the top side of the down tube 145 that forms a curved (convex or semi-spherical) bump on the interior side of the rear wall 160.

The strut 150 is inserted into the down tube 145 via an upper opening 180 or a lower opening 185 in the head tube. The illustrated strut 150 includes an elongated tubular member 190 that is positioned within the down tube 145. Opposed ends of the tubular member 190 are respectively engageable with the first and second alignment features 170, 175 to properly orient the strut 150 internally within the down tube 145. As illustrated, the strut 150 is hollow, although the strut 150 may be a solid tubular member 190.

With reference to FIGS. 6 and 7, the strut 150 is adhered or fixed to front wall 155 over the first alignment feature 170 (e.g., using epoxy 195) if it is desired to prevent removal or movement of the strut 150 after insertion. The strut 150 also or alternatively is adhered or fixed to the rear wall 160 over the second alignment feature 175. In some constructions, the strut 150 can be removably coupled to the down tube 145 (e.g., using threaded fasteners).

The strut 150 is inserted into the down tube 145 through the upper opening 180 or through the lower opening 185 in the head tube so that one end of the strut 150 is engaged with the second alignment feature 175. The other end of the strut 150 is then pushed into engagement with the front wall 155 over the first alignment feature 170 so that the strut 150 is snapped into place between the front wall 155 and the rear wall 160. The first and second alignment features 170, 175 are substantially centered laterally on the respective rear and front walls 160, 155 so that the strut 150 is spaced inward from (e.g., centered between) the side walls 165. Epoxy 195 or another adhesive can be applied to the corners of the alignment feature on the interior side of the front wall 155 and the rear wall 160, to the end of the tubular member 190, or to some combination or all of the engaging surfaces to fix the strut 150 within the down tube 145.

Like the strut 150 described with regard to FIGS. 2-5, the strut 150 illustrated in FIGS. 6 and 7 is oriented substantially horizontally within the down tube 145 adjacent the head tube to stiffen the down tube 145 by transferring a load from the front wall 155 to the rear wall 160. With reference to FIG. 6, the strut 150 intersects a longitudinal axis 200 extending along a centerline of the down tube 145 between the front wall 155 and the rear wall 160 at a non-right angle.

Figure 8:
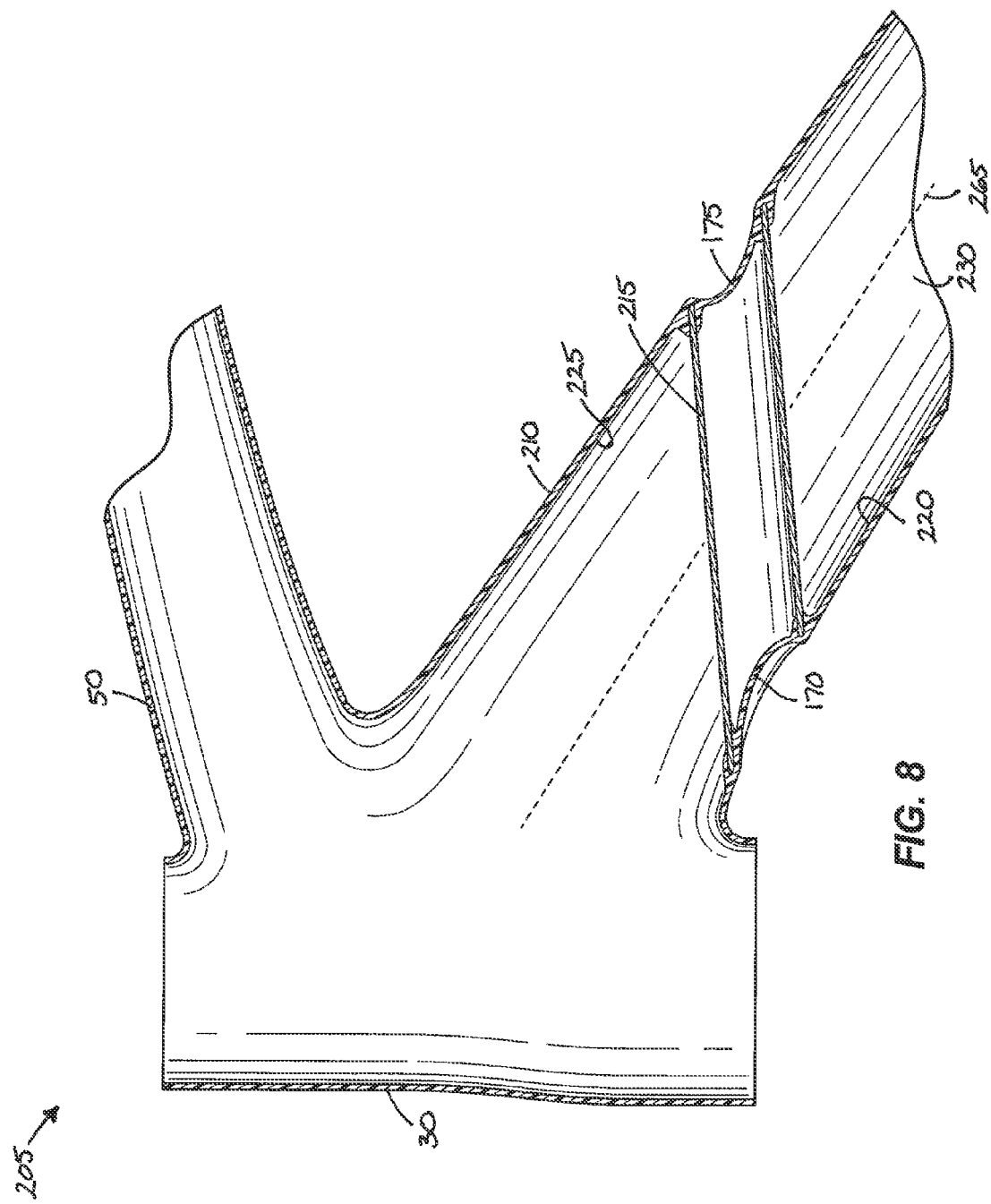
FIG. 8 is a cross-section of a portion of a third bicycle frame including a down tube and a strut co-cured with the down tube.

FIG. 8 illustrates a portion of a third bicycle frame 205 including the head tube 30, the top tube 50, a down tube 210 connected to the head tube 30, and a strut 215 coupled to the down tube 210. In particular, the strut 215 illustrated in FIG. 8 is formed of a different material relative to the down tube 210 and is co-cured with the down tube 210 between front and rear walls 220, 225 (rather than separately inserted as described with regard to FIGS. 2-7). In addition, the illustrated strut 215 is centered between side walls 230 so that the ends of the strut 215 are positioned over and engaged with the first and second alignment features 170, 175 when the frame 205 is formed.

Figure 9:
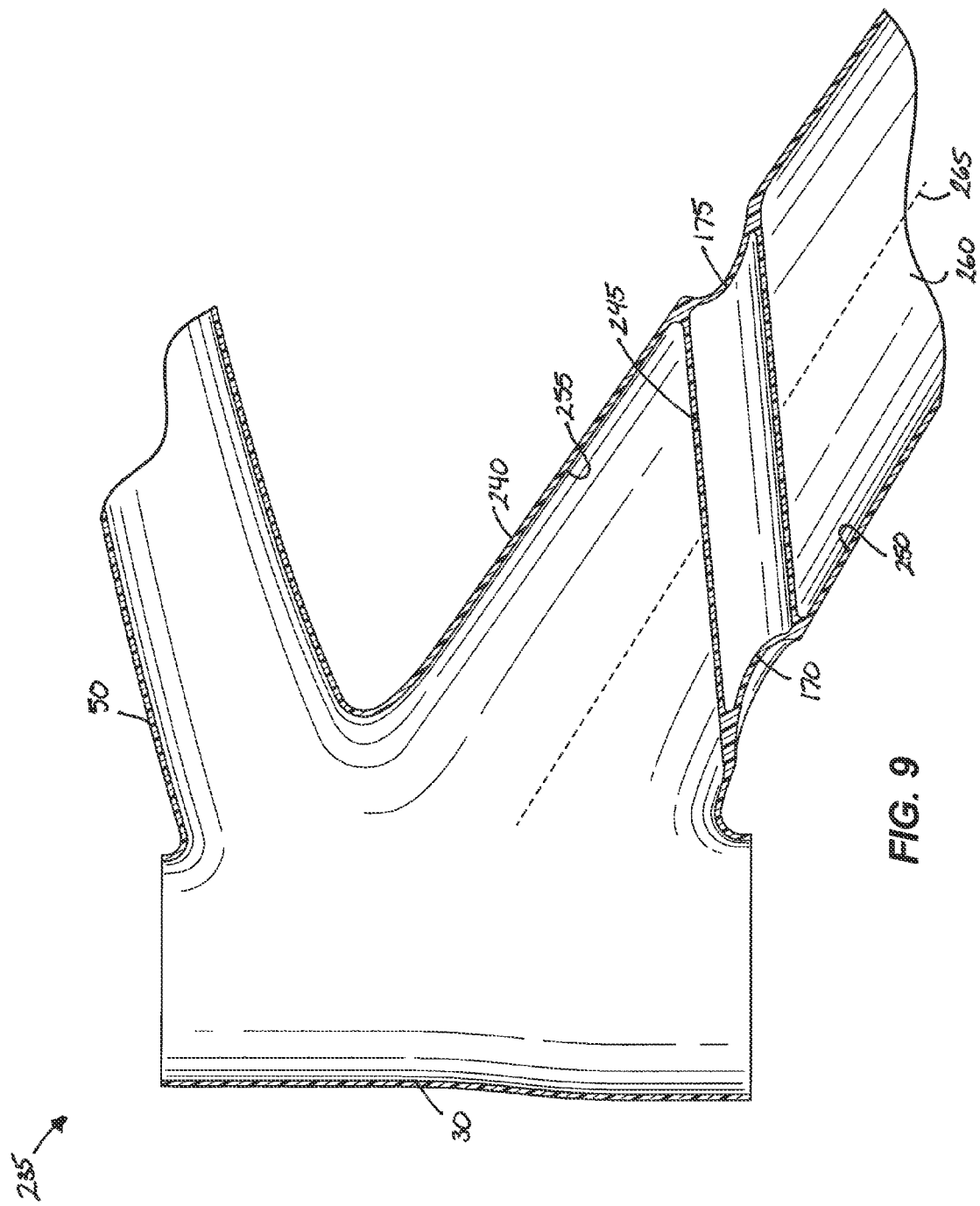
FIG. 9 is a cross-section of a portion of a fourth bicycle frame including a down tube and a strut co-molded with each other.

FIG. 9 illustrates a portion of another bicycle frame 235 including the head tube 30, the top tube 50, a down tube 240 connected to the head tube 30, and a strut 245 coupled to the down tube 240. The frame 235 is similar to the frame 205 described with regard to FIG. 8, except that the strut 245 illustrated in FIG. 9 is formed of the same material as the down tube 240 and is co-molded with the down tube 240 (rather than separately inserted or co-cured as described with regard to FIG. 8). The ends of the strut 245 are formed in engagement with front and rear walls 250, 255 of the down tube 240 that have the respective first and second alignment features 170, 175 so that the strut 245 is spaced from side walls 260 when the frame 235 is formed.

Like the struts 95, 150 illustrated in FIGS. 2-7, each strut 215, 245 illustrated in FIGS. 8 and 9 is oriented substantially horizontally within the down tube 210, 240 adjacent the head tube 30 to stiffen the down tube 210, 240 by transferring a load from the front wall 220, 250 to the rear wall 225, 255. With reference to FIGS. 8 and 9, each strut 215, 245 intersects a longitudinal axis 265 extending along a centerline of the down tube 210, 240 between the front wall 220, 250 and the rear wall 225, 255 at a non-right angle.

With reference to FIGS. 1-9, the strut 95, 150, 215, 245 is located in close proximity to the juncture between the head tube 30 and the down tube 55, 145, 210, 240 so that the strut 95, 150, 215, 245 acts as a stiffener for the frame 25, 140, 205, 235. By positioning the strut 95, 150, 215, 245 between and in engagement with the front wall 75, 155, 220, 250 and the rear wall 80, 160, 225, 255, the load experienced by the frame 25, 140, 205, 235 on the underside of the down tube 55, 145, 210, 240 (i.e. the load along the front wall 75, 155, 220, 250) is transferred to the rear wall 80, 160, 225, 255 or top side of the down tube 55, 145, 210, 240. Transferring the load in this manner reduces the risk that the down tube 55, 145, 210, 240 will buckle in response to relatively high loads on the frame 25, 140, 205, 235. In testing, it has been shown that the strut 95, 150, 215, 245 can increase the strength of the head tube 30 by at least 25%.

Various features and advantages of the invention are set forth in the following claims.

The invention claimed is:

1. A bicycle comprising:
   a front wheel;
   a rear wheel;
   a bicycle frame assembly supported on the front and rear wheels, the bicycle frame assembly including:
   a front fork supported by the front wheel; and
   a main frame including a head tube and a down tube extending rearward and downwardly relative to the head tube, the down tube including a front wall, a rear wall, a sidewall, and an internal strut connecting the front wall and the rear wall and spaced from the sidewall.

2. A bicycle as claimed in claim 1, wherein the internal strut includes a tubular member.

3. A bicycle as claimed in claim 1, wherein the internal strut is one of co-cured and co-molded in place within the down tube.

4. A bicycle as claimed in claim 1, wherein a front end of the internal strut is positioned adjacent an upper end of the front wall of the down tube.

5. A bicycle as claimed in claim 1, wherein an interior of the down tube includes an alignment feature engaged with the internal strut.

6. A bicycle frame assembly comprising:
   a front fork adapted to be supported by a front wheel; and
   a main frame including a head tube and a down tube extending rearward and downwardly relative to the head tube, the down tube including a front wall, a rear wall, and an internal strut connecting the front wall and the rear wall,
   wherein an interior of the down tube includes an alignment feature engaged with the internal strut.

7. A bicycle frame assembly as claimed in claim 6, wherein the down tube includes a sidewall and wherein the internal strut is spaced from the sidewall.

8. A bicycle frame assembly as claimed in claim 6, wherein the internal strut includes a tubular member.

9. A bicycle frame assembly as claimed in claim 8, wherein the rear wall of the down tube includes an opening aligned with the tubular member such that an interior of the tubular member is exposed.

10. A bicycle frame assembly as claimed in claim 6, wherein a front end of the internal strut is positioned near an upper end of the front wall of the down tube.

11. A bicycle frame comprising:
    a main frame including a head tube and a down tube extending rearward and downwardly relative to the head tube, the down tube including a front wall, a rear wall, and an internal strut connecting the front wall and the rear wall,
    wherein the down tube defines an opening and the strut is coupled to the down tube by insertion through the opening.

12. A bicycle frame as claimed in claim 11, wherein the down tube includes a sidewall and wherein the internal strut is spaced from the sidewall.

13. A bicycle frame as claimed in claim 11, wherein the down tube includes two sidewalls and wherein the internal strut is spaced from the two sidewalls.

14. A bicycle frame as claimed in claim 11, wherein the internal strut includes a tubular member.

15. A bicycle frame as claimed in claim 14, wherein the rear wall of the down tube includes the opening, and wherein the opening is aligned with the tubular member such that an interior of the tubular member is accessible.

16. A bicycle frame as claimed in claim 11, wherein a front end of the internal strut is positioned near an upper end of the front wall of the down tube.

17. A bicycle frame as claimed in claim 11, wherein an interior of the down tube includes an alignment feature engaged with the internal strut.

18. A bicycle frame as claimed in claim 11, wherein the internal strut includes a flange engaged with an exterior surface of the down tube.

* * * * *